US012620026B1

(12) United States Patent
Carmel et al.

(10) Patent No.: US 12,620,026 B1
(45) Date of Patent: May 5, 2026

(54) AGENTIC FRAMEWORK FOR INTENT-DRIVEN RESPONSES IN COMPUTER-BASED MORTGAGE SYSTEMS

(71) Applicant: PollyEx, Inc., San Francisco, CA (US)

(72) Inventors: Adam Carmel, San Francisco, CA (US); Jonathan Foy, Fullerton, CA (US); Austin M. Hoyle, Nevada City, CA (US); David B. Torrance, Portland, OR (US); Michael G. Ouellette, Oro Valley, AZ (US)

(73) Assignee: PollyEx, Inc., San Francisco, CA (US)

( * ) Notice: Subject to any disclaimer, the term of this patent is extended or adjusted under 35 U.S.C. 154(b) by 0 days.

(21) Appl. No.: 19/199,527

(22) Filed: May 6, 2025

(51) Int. Cl.
G06Q 40/03 (2023.01)
G06F 40/35 (2020.01)
G06F 40/40 (2020.01)
G06Q 30/015 (2023.01)

(52) U.S. Cl.
CPC .............. G06Q 40/03 (2023.01); G06F 40/35 (2020.01); G06F 40/40 (2020.01); G06Q 30/015 (2023.01)

(58) Field of Classification Search
CPC ........ G06Q 30/02; G06Q 10/10; G06Q 30/06; G06Q 40/08; G06Q 10/06; G06Q 30/00; G06Q 10/08; G06Q 50/10; G06Q 50/01; G06F 40/35; G06F 40/40
See application file for complete search history.

(56) References Cited

U.S. PATENT DOCUMENTS

| | | | |
|---|---|---|---|
| 7,818,219 B2 | 10/2010 | Klivington et al. | |
| 12,227,457 B2 | 2/2025 | Lesage et al. | |
| 12,277,457 B1 * | 4/2025 | Shetty .................... | G06N 20/00 |
| 2001/0047326 A1 | 11/2001 | Broadbent et al. | |
| 2006/0143684 A1 * | 6/2006 | Morris ............... | H04N 1/00196 |
| | | | 725/138 |
| 2007/0067234 A1 | 3/2007 | Beech | |
| 2010/0145827 A1 | 6/2010 | Callow et al. | |
| 2019/0052466 A1 | 2/2019 | Bettger | |
| 2019/0052467 A1 | 2/2019 | Bettger | |
| 2021/0304155 A1 | 9/2021 | Blackburn et al. | |
| 2025/0200489 A1 * | 6/2025 | Ghoche ............... | G06Q 10/067 |
| 2025/0225587 A1 * | 7/2025 | La Placa ............... | G06Q 40/06 |

* cited by examiner

*Primary Examiner* — Hao Fu
(74) *Attorney, Agent, or Firm* — Build IP, LLC; Robert V. Donahoe

(57) ABSTRACT

A method of performing an intention classification with a first large language model included in a first agent included in a multi-agent system, the first large language model configured to receive the input message as a text input, the intention classification associating an intent of the request with a corresponding action. Sending, from the first large language model to an action router, a response including a key that uniquely identifies an action handler from among a plurality of available action handlers, the action handler designated to coordinate operations of the multi-agent system to complete the corresponding action with a workflow defined by the selected action handler. Completing the workflow, at least in part, with the designated action handler generating function calls directed to the multi-agent system and processing API responses received from the multi-agent system to complete tasks included in the predetermined set of tasks.

16 Claims, 7 Drawing Sheets

200

Agentic Frontend

Agentic API Tool Belt

Intent Classifier
232

224

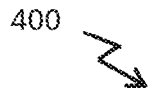

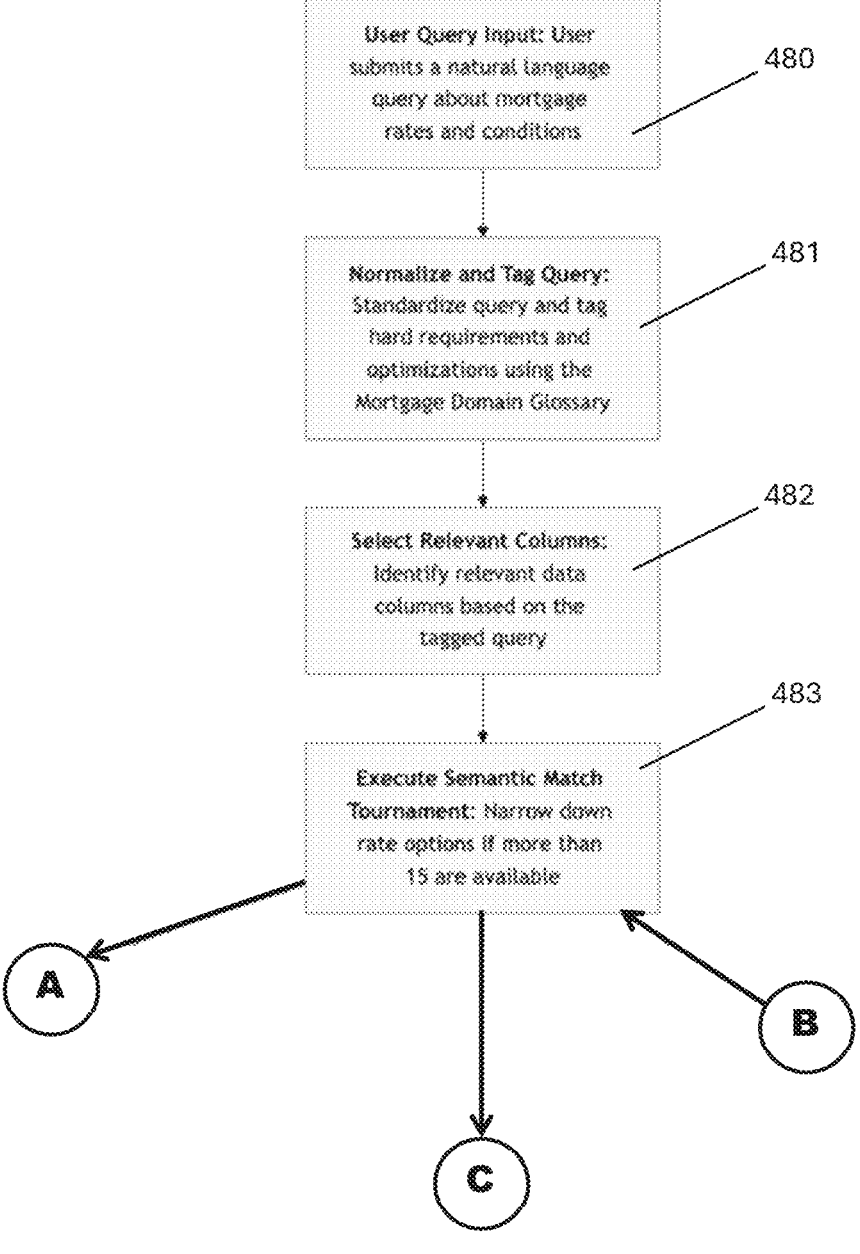

400

480 — User Query Input: User submits a natural language query about mortgage rates and conditions 481 — Normalize and Tag Query: Standardize query and tag hard requirements and optimizations using the Mortgage Domain Glossary 482 — Select Relevant Columns: Identify relevant data columns based on the tagged query 483 — Execute Semantic Match Tournament: Narrow down rate options if more than 15 are available

Figure 5:
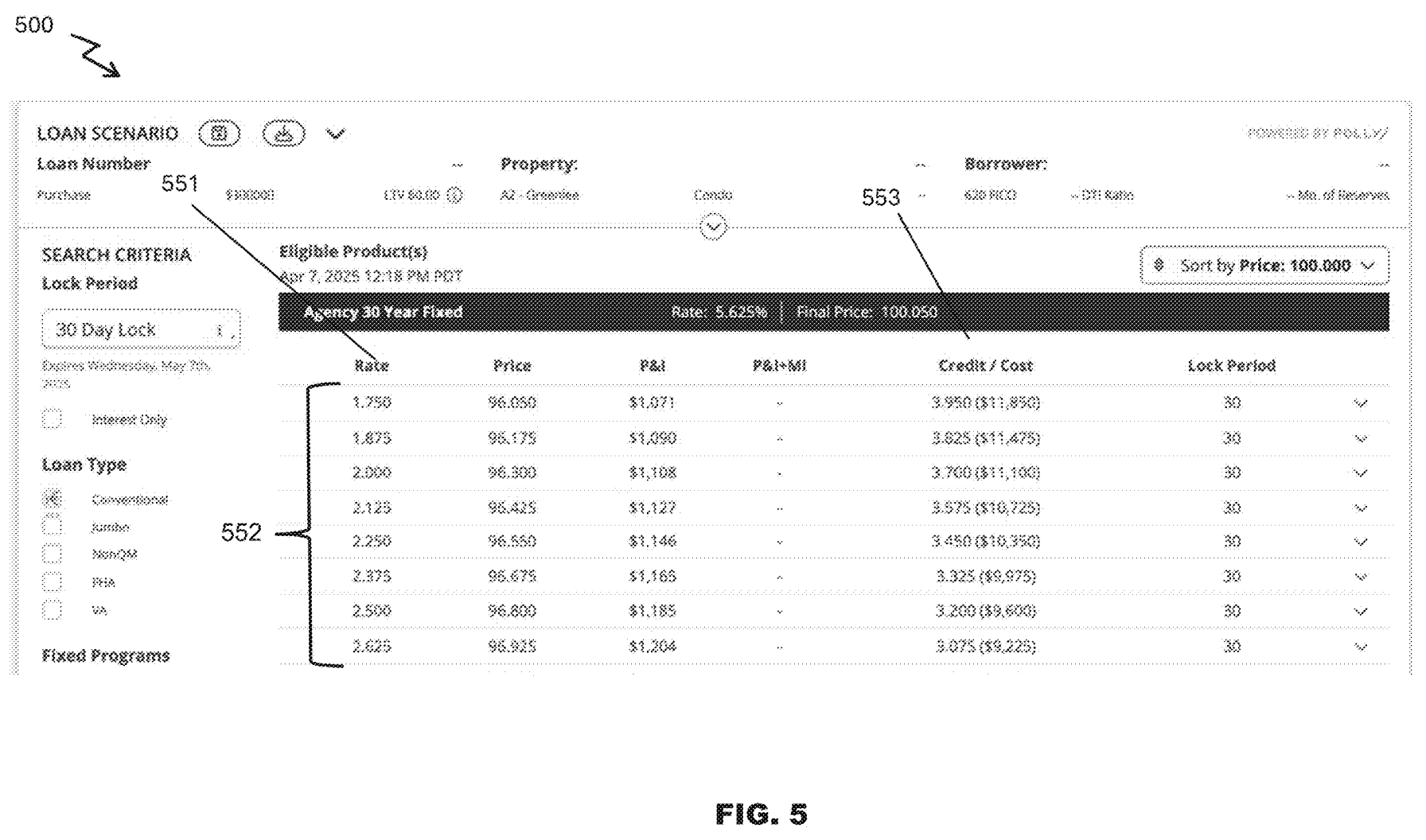

LOAN SCENARIO
Loan Number     551
Property:
Borrower:

SEARCH CRITERIA
Lock Period
30 Day Lock

Loan Type

Fixed Programs

Eligible Product(s)     551
Agency 30 Year Fixed

Sort by Price: 100.000

Rate: 5.625%     Final Price: 100.050     553

552

| Rate | Price | P&I | P&I+MI | Credit / Cost | Lock Period |
|---|---|---|---|---|---|
| 1.750 | 96.050 | $1,071 | - | 3.950 ($11,950) | 30 |
| 1.875 | 96.175 | $1,090 | - | 3.825 ($11,475) | 30 |
| 2.000 | 96.300 | $1,108 | - | 3.700 ($11,100) | 30 |
| 2.125 | 96.425 | $1,127 | - | 3.575 ($10,725) | 30 |
| 2.250 | 96.550 | $1,146 | - | 3.450 ($10,350) | 30 |
| 2.375 | 96.675 | $1,165 | - | 3.325 ($9,975) | 30 |
| 2.500 | 96.800 | $1,185 | - | 3.200 ($9,600) | 30 |
| 2.625 | 96.925 | $1,204 | - | 3.075 ($9,225) | 30 |

600

AGENTIC FRAMEWORK FOR INTENT-DRIVEN RESPONSES IN COMPUTER-BASED MORTGAGE SYSTEMS

BACKGROUND OF INVENTION

1. Field of Invention

This invention relates generally to computer based systems. More specifically, at least one embodiment, relates to an agentic framework for intent-driven responses in computer-based mortgage systems.

2. Discussion of Related Art

Today, mortgage industry operations rely heavily on computer-based systems, in part, because of the huge amount of information that must be sorted and processed in a search. The problem has increased over time due to the variations found among mortgage offerings, the number of competing products and the ability for these offerings to slightly differ based on the borrower's qualifications and the property. These computer-based systems allow loan officers to evaluate possible mortgage product options for any given request where it is impractical to perform the analysis in the human mind. However, current approaches suffer from problems that limit their effectiveness. One common approach is to provide these systems with rigid rules-based decision trees that are used in searches for a desired product. This approach lacks the flexibility to properly process queries given the size of the information set and dynamic nature and nuance found in queries. Other current tools are expected to operate in a highly autonomous manner where they are solely responsible for a wide range of complex operations. In practice, these tools provide results that can be unpredictable. For example, large language models (LLMs) are being introduced into mortgage systems. However, LLMs are generally stochastic in nature. That is, there is an element of randomness to their responses even when they receive the same natural language input.

In addition, mortgage product and rate data provides a vast, multi-dimensional data set that traditional systems cannot effectively search when presented with a natural language request. These natural language queries are often nuanced because they provide a set of objectives presented in a form that includes objectives that may compete with one another. For example, a user may offer "I need a $5K rebate combined with the lowest rate and a price close to par." These queries can include a mix of quantitative and qualitative criteria that require logical leaps. Traditional systems struggle with these types of mortgage product and rate data searches queries due to the vast amount of information present in today's mortgage rate stacks and because these queries include requirements that are not well suited to rigid filters or algorithms that seek exact matches.

In addition, traditional AI-based approaches can overwhelm conventional reasoning models with complete sets of data, for example, mortgage product records that can number in the hundreds of thousands. That is, presenting a large language model with so much information that it is unable to hold attention/context when performing such a complex task.

SUMMARY OF INVENTION

Embodiments described herein overcome the above-described problems found with conventional computer-based mortgage systems. For example, various embodiments provide an agent-based AI system including intent classification. An intent classifier includes a large language model that operates to classify an intent of a user query and identify an action handler to orchestrate operation of the system using a predefined workflow. The multi-agent system includes a plurality of agents each including an associated large language model. The individual large language models can be individually fine-tuned with examples to optimize the respective agent for the reasoning task(s) to which it is dedicated. The action handlers designated for specified actions provide the logic for the defined workflow to complete the respective action using the multi-agent system. The structure of the overall agentic framework provides a dynamic toolset that allows a query to be resolved through a series of actions performed by specialized agents assigned to a task by the action handler. This structure provides more consistent operation by reducing the complexity of the individual task(s) or sub-task(s) performed by each agent. The system also provides a discrete focus that provides more consistent results because the action handler has a predefined set of tasks for completion by a predefined set of agents in a predefined order to resolve a user's query. This resolves queries using large language models to deliver deterministic results.

The agent-based AI system also includes a generalist agent that is employed to respond to user messages for which a specific intent is not identified by the intent classifier. This provides the system with an ability to respond in context to messages for which only a general intent is identified by the intent classifier. The use of a conversational agent or chat widget provides the system with an ability for an on-going dialog with the user that can result in an identification of a specific intent, in a form of "self-healing" operation.

Embodiments of the AI agent-based system include a semantic matching agent to resolve user queries with precise, context aware and user-friendly results for mortgage product and mortgage rate data searches. These embodiments can employ a set of AI agents each including a respective large language model that is fine tuned for the reasoning task that it is assigned in a workflow that identifies the proper data from within a mortgage rate stack that reflects what the user is asking for. Some of these embodiments operate to search data that is organized in a tabular format, for example, spreadsheets and .csv files, (that is, a known file-type) to provide refined highly responsive replies to mortgage product and mortgage rate data queries that are impossible to parse for traditional computer-based mortgage systems. The operation of the AI agent-based system is flexible and unconstrained by rigid matching algorithms and can provide results that may not provide an exact match but are relevant in context because they include solutions that are close to meeting the conditions established by the user's query.

Unlike conventional AI approaches, embodiments described herein employ one or more AI agents in operation of a tournament-based semantic match on mortgage records that are included in a tabular mortgage "rate stack." These embodiments systematically organize qualifying mortgage records into subgroups that are concurrently evaluated by the large language model. This process operates to continuously reduce the total quantity of qualifying records and optimize performance by selecting a subset of records from each subgroup at each round based on those records that most closely match the user's mortgage product and mortgage rate data queries. This dynamically reduces the search space while maintaining the context of the query. Results are provided with a large language model that explains the best matching mortgage records using natural language and in the context of the original query.

As used in herein, the terms "semantic match" and "semantic matching" are used to describe a reasoning-based search that leverages the capabilities of a large language model to identify a similarity between information available in tabular data to elements of a user's query while considering inter-related factors that impact the suitability of a potential match. One of ordinary skill in the art in view of the disclosure herein will recognize that a search of quantified data included in a set of tabular data with a reasoning-based approach, considering the factors, to identify and rank records that best match the requirements and objectives (that is, what the user is asking for while considering these inter-related factors) included in a text-based user query provides a "semantic match" or "semantic matching" as the terms are used herein. One of ordinary skill in the art in view of the disclosure herein will also recognize that an approach that searches a vector database utilizing some form of vector based comparison or search method, for example, a nearest-neighbor algorithm, lacks this reasoning and therefore does not perform "semantic matching" or provide a "semantic match" as the terms are used herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 illustrates a graphical user interface including records available in an electronic file according to one embodiment.

DETAILED DESCRIPTION

Figure 1:
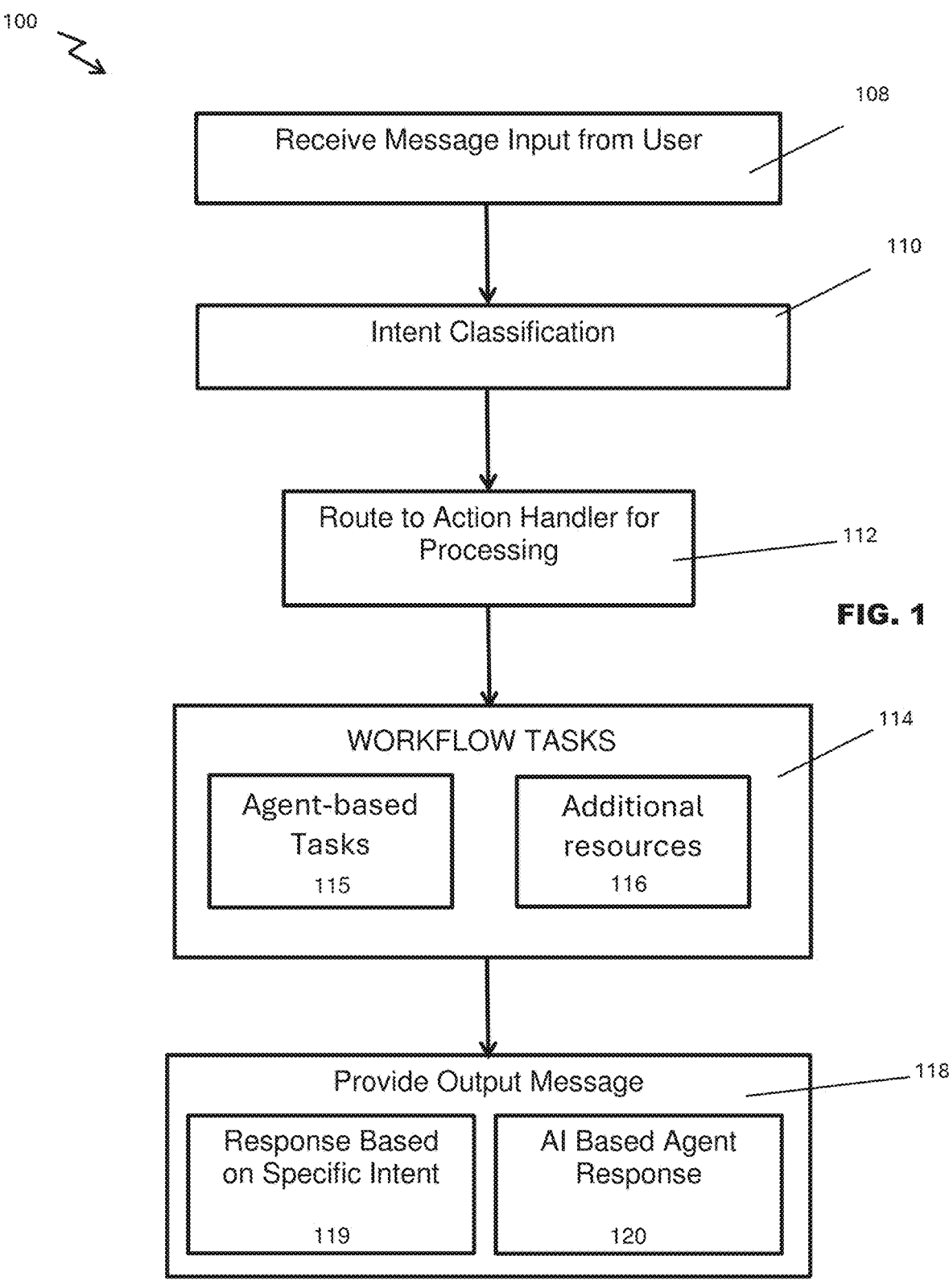
FIG. 1 illustrates a flow diagram of a process performed by an agent-based AI system.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Embodiments of the agentic-based AI system described herein provide a dynamic framework with which user queries can be effectively resolved. The intent classifier as described herein allows for these queries to be processed with the system having a clear understanding of the problem to be solved based on the user's intent as conveyed in the query. An identification of the assigned action handler at the front end of the process results in operations performed based on an early identification of tasks and sub-tasks that should be performed to effectively respond to the query. This also limits autonomy that is allowed the large language models employed in the system that might otherwise establish a less effective set of operations to resolve the query. The action handler responsible for resolving the query operates to provide API calls to additional agents and other function calls as needed to resolve the query and return a natural language response. In this role, the action handler which can be identified based on an identified intent, orchestrates operation by other agents to complete sub-tasks, receive resulting data and other information returned to the action handler from the agents and other system resources, and provide follow-on function calls as needed to resolve the user's query and generate a natural-language response.

The technical advantages provided by the embodiments described herein are achieved by employing the action handlers to identify specific actions and sets of actions to complete within the overall framework of the agentic-based AI system. This approach provides the benefits of structured planning to coordinate overall operation while allowing the reasoning capabilities of the large language models to be fully leveraged in a more focused way. That is, by planning activities for specialized agents in advance for a given set of tasks, the agentic framework overcomes technical problems found with systems that give their LLMs full autonomy including freedom to define how to complete tasks in real time. In summary, the embodiments described herein leverage the capabilities of large language models in a manner that delivers deterministic results not typically produced by other more autonomous LLM frameworks.

The identification of these actions also reduces the complexity of the various tasks and sub-tasks required to be performed by any one of the large language models included in the agentic-based AI system. Less costly large language models can be employed because the complexity and the breadth of the tasks and sub-tasks they perform are reduced. This reduces the computational load placed on each agent. In addition, the on-going availability of the chat widget in combination with the intent classifier provides the system with an ability to maintain a conversational dialog in context. This allows the system to adapt to the substance of the user query and identify a user's intent or provide an alternate relevant natural-language response even if a specific intent cannot be classified.

In various embodiments, operation of the AI agent-based system is flexible and unconstrained by rigid matching algorithms and can provide results that may not provide an exact match but are relevant in context because they are a close solution. For example, a user message may establish that "I need a payment no more than $1500 month." Traditional sorting techniques system apply "hard" filters with fixed requirements that lack context. Faced with the preceding user message, a traditional approach will eliminate a result that is even just a dollar outside the requirement. In this case, an eligible mortgage product that requires a payment of $1501 will be excluded from the results. In contrast, embodiments, described herein perform sorting with a large language model that is fine tuned to use discretion to find useful results. Therefore, given the user message provided above, embodiments described herein will include a result with a payment of $1501.

The intelligent sorting algorithm described herein solves the technical problems found with traditional rules-based sorting algorithms because it employs a semantic match sorting that includes qualitative criteria rather than just being based on integer values. This improves the search results because it captures the nuances of the user's intent to deliver the most relevant options. Semantic sorting is supported through operation of multiple different agents with separate large language models trained to tag and classify the features of the mortgages of interest based on the user query, and to identify the locations of the information within the records included in the data set, respectively. Some embodiments include tournament-style semantic match sorting that evaluates subsets of eligible mortgage products and combines the best matching results in each subgroup in an iterative process that reduces the quantity of candidate-records at each round. The process continues until a threshold quantity of records is reached. A final semantic matching round is completed to select the best matching from among this final subgroup of "winners." Including qualitative search criteria provides the large language model that performs the semantic match process with discretion to find all useful results even those that are not precise matches. The overall agentic framework and workflow also provides an advantage because a conversational response can explain nuanced results in context, for example, what results are being shared and why.

Referring to FIG. 1, a flow diagram of a process 100 performed by an agent-based AI system is illustrated in accordance with various embodiments. The process 100 provides a general overview of operations performed by the system to illustrate at a high level the role of system elements including the intent classifier, the complete set of agent-based tools and the AI-based chat widget. A portion of an example session is provided in Table 1 to provide context for the description of the process 100.

device in a natural language. The message input is provided to a chat widget included in the front end of the agent-based AI system which operates to generate a text input for the large language model included in the intent classifier. The intent classifier operates on the user's message as provided in the text input to perform an intent classification operation at block 110. The intent classifier operates to identify an intent and an action corresponding to the intent, for example, explain ineligibility, run a near miss scenario, update a form. The intent classifier returns an action key that corresponds to the action handler designated to handle the action and initiate a predetermined set of tasks to be completed to respond to the user's message at block 112. The designated action handler is configured to leverage the agent-based AI system and other resources by orchestrating a set of operations that can include agent operations utilizing the respective large language models at block 114. In various embodiments, a single agent or a set of agents included in the agent-based AI system operate to perform the tasks and sub-tasks required to respond to the query at block 115. The operations completed at block 114 can also include other function calls at block 116 that call other non-agent functions and other resources to complete tasks needed to provide a response message. The response message is provided in a natural language and presented to the user via the chat widget at block 118. According to various embodiments, response messages can take two general forms depending on the results of the intent classification at block 110.

For example, Table 1 illustrates an intent classification that finds a specific intent. Here, following an introduction from the chat widget the user provides a message "we want the lowest rate but the borrower can only afford to buy down up to $5K." At block 110, the intent classification large language model outputs a system message "explain pricing." The system message identifies a specific intent to the back-

TABLE 1

1  CHAT WIDGET: Hi I'm Polly AI. I can help you get more done, faster. How can I help you today?
2  USER MESSAGE: we want the lowest rate but the borrower can only afford to buy down up to $5K
3  AGENTIC BACKEND [Intent Classifier]: explain pricing
4  AGENTIC BACKEND [Normalization Tagger Agent]: lowest RATE(OPTIMIZATION) with CREDIT/COST around 5000(OPTIMIZATION)
   ...
n  CHAT WIDGET: Here's a summary of the rates tailored to your criteria of seeking a low rate with the ability to pay around $5,000 for buying down:
   -        Agency 10/6 SOFR ARM with a rate of 3.875%, costing $5,325.00 with a lock period of 30 days.
   -        Agency 30 Year Fixed with a rate of 4.25%, costing $4,350.00 with a lock period of 30 days.

The example session illustrated in Table 1 includes separate rows for: communication received from the user by the chat widget; output messages provided by an agent-based AI system; and responses generated by the chat widget following execution of a set of tasks performed by the agent-based AI system. For clarity, only some of the activities of the agent-based AI system are included in Table 1. Some of the activities that are not included in Table 1 are described further below with reference to the process illustrated in FIG. 4. The session illustrates the use of natural language processing employed in response to user queries.

The process 100 begins with a receipt of a message input received from a user at block 108. The message(s) received from the user are input by the user from a user computing end that also identifies the respective action handler that is designated to manage operations that provide the output message. In this example, the action handler communicates information from the user message to a normalization tagger agent (block 114). The normalization tagger agent is the first of multiple agents that are employed together to resolve this user query and return a reply in context. Here, the normalization tag or agent outputs tags to place the user's query in a standard format and tag it with descriptors. The descriptors can include requirements that must be met and improvements or "optimizations" that are desired but not required. Here, at Step 4, the normalization tagger replies with the tags "lowest RATE" and "CREDIT/COST around 5000." Each of these include the descriptor (OPTIMIZATION) to indicate that these criteria are desired by the user but are not required. That is, the optimizations are objectives or goals but are not required.

These and other operations are completed at block 114 of FIG. 1, before a response message is generated at block 118. Because the intent classification identifies a specific intent at block 110, the response is based on the specific intent at block 119. The example in Table 1 illustrates a response message that provides a summary of rates with the original context "Here's a summary of the rates tailored to your criteria of seeking a low rate with the ability to pay around $5,000 for buying down" that is delivered to the user via the chat widget.

The system includes a self-healing aspect that also allows it to provide response messages even where the intent classification at block 110 only identifies a general intent. For example, if a user provides a query that lacks sufficient information to identify a specific intent, the system can provide a response message at block 120 that either provides the best available general response or respond with a query of its own. The capabilities of the chat widget in combination with the agent-based AI system deliver a natural language dialogue to the user. According to some embodiments, the agent-based AI system includes a domain generalist agent, for example, a mortgage assistant. The mortgage assistant can be employed to answer general questions on mortgages and mortgage pricing where specific intent is not found at block 110. One example of these capabilities is in circumstances where the user message provides a question that lacks specifics. For example, a user faced with a set of results for a family of mortgage products such as a 30 year fixed mortgages may inquire "why is the borrower ineligible for the 30 year fixed products?" Here, the mortgage assistant agent is employed at block 115 to generate a Q&A agent response "I can assist. Please let me know the name of the product you are interested in." The response received from the user in reply to the follow-up is treated as a new message at block 108. With sufficient information, such as an identification of the product, a specific intent can be identified at block 110 routed to the appropriate action handler at block 112 to coordinate back-end operations at block 114. The result of these actions is the delivery of a response based on specific intent at block 119.

Figure 2:
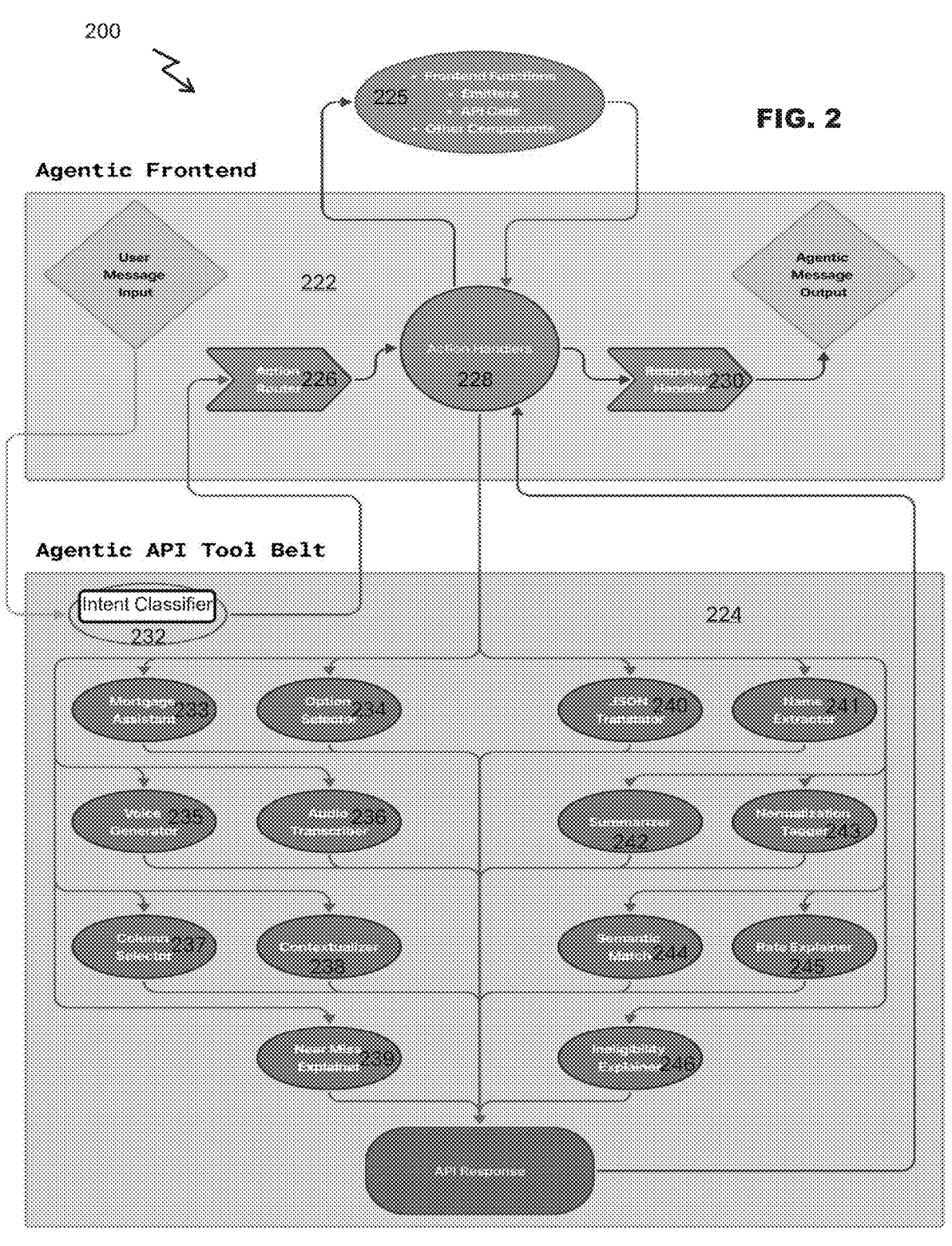
FIG. 2 illustrates a system level block diagram of an agent framework in accordance with one embodiment.

Referring now to FIG. 2, a system level block diagram of an agentic framework 200 of an agent-based AI system is illustrated in accordance with various embodiments. The agentic framework 200 includes an agentic frontend 222 and a multi-agent system 224 that includes a plurality of AI agents each dedicated to performing a respective task or set of tasks within the overall operation of the agent-based AI system. The intent classification included as a part of the multi-agent system 224 allows the system 224 to provide an action handler that is dedicated to completing the overall task with a set of operations that are known from the start. This approach provides the benefits of structured planning to coordinate overall operation for a known intent while allowing the reasoning capabilities of the large language models to be fully leveraged in a more focused way. That is, by planning activities for specialized agents in advance for a given set of tasks based on intent, the agentic framework 200 overcomes technical problems found with systems that give their LLMs full autonomy including freedom to define how to complete tasks in real time. In summary, the embodiments described herein leverage the capabilities of large language models in a manner that delivers deterministic results not typically produced by other more autonomous LLM frameworks.

According to the illustrated embodiment, the frontend 222 includes an action router 226, action handlers 228, a response handler 230, and a chat widget. The chat widget is employed to receive user message inputs and return message outputs from the multi-agent system 224 and to do so in a conversational manner in a natural language. Although different categories of users having various roles can employ the agentic framework 200 depending on the embodiment, a user having the role of a loan officer is described in the examples provided herein. The front end 222 orchestrates operation of multi-agent system 224 with an action handler 228 selected to handle the user's message communicating with the other agents within the multi-agent system 224. In general, the communication consists of function calls from the action handler 228 and API responses from the agents. The action handlers 228 are also configured to communicate with additional resources 225 that are accessed by the agentic framework to perform the tasks required to complete the action identified by the intent. For example, function calls can be made to backend services included in a web hosted mortgage system as illustrated and described with reference to FIG. 3. The additional resources 225 can also include third party resources such as generalist large language models and large language model fine-tuning systems hosted by third parties. The function calls can include API calls made to the backend services or third party resources and retrieval of API responses for processing with the front end 222 and/or elements included in the multi-agent system 224.

The front end also includes an action router 226 and a response handler 230. Where an action corresponds to an identified intent, the action router 226 operates to activate one of the action handlers 228 based on the intent received from an intent classifier included in the multi-agent system 224. The response handler operates to generate a conversational output for the chat widget from information received by the action handler. For example, an output from a large language model received by the action handler in an API response returned from the multi-agent system 224.

In the illustrated embodiment, the multi-agent system 224 provides a decentralized agent network that includes agents dedicated to specialized functions within the system 224. Each of the agents includes a large language model that is trained in designated tasks and operates to deliver an output required to complete the task. In embodiments, some of these agents can include a foundational large language model with a system message unique to that agent. The system message provides the base operating instructions for the agent including an identification of the task it is to perform, the type of input it can expect to receive, and what the agent is expected to do with the input (for example, as established in instructions or a set of rules). Some of these agents can also include large language models that are trained in a fine-tuning process. The fine tuning can include training data including sets of: system messages; user messages; and output messages for that agent. The training can include the use of session data or synthetic data that is specifically created to train the model with realistic examples.

As described in more detail below, an intent classifier agent 232 enables the decentralized operation with an identification of a responsible action handler based on the content of the user's message. Among the multi-agent system, a mortgage assistant agent 233 provides an agent that is trained for a variety of more generalized tasks for a specific domain, here mortgage operations. The multi-agent system 224 includes an option selector agent 234 to select an option from a set of options. Specifically, the option selector agent 234 is trained to select an option from among a set of possible options each associated with a unique ID. The option selector agent 234 returns the unique ID for the selected option.

A voice generator agent 235 and an audio transcriber agent 236 are included to facilitate dialog in a natural language. For example, the voice generator agent 235 is a text-to-speech machine learning model that generates an audio stream based on the given text. This is used to enable the chat widget to provide an audio response in a natural language. The audio transcriber agent 236 is a speech-to-text machine learning model that generates a text transcription of an audio file. This is used to allow the user to dictate messages to the chat widget. A column selector agent 237 is provided for use with certain file types that are sources of information used to resolve user queries. A contextualizer agent 238 operates in combination with the chat widget for example where retrieval-augmented generation (RAG) is employed to generate natural language responses. The system 224 also includes a JSON translator agent 240 that operates to output JSON based on the text included in the user's message, a name extractor agent 241 which operates to extract the name or subject from a message, and a summarizer agent 242 to summarize the text of messages processed by the system, for example, with longer messages before storing conversation history to reduce overall token usage. A set of agents employed to generate explanations to user messages are also included. In the illustrated embodiment, these include a near miss explainer agent 239, a rate explainer agent 245, and an ineligibility explainer agent 246.

In operation, the intent classifier agent 232 receives the user message received from the chat widget and determines an intention and, if an action matches the intent, provides an action key that is employed by the action router 226 to route the action to the appropriate action handler to handle the request. Each of the action handlers 228 defines a particular workflow including a predetermined set of tasks. The workflow also includes an identification of any agents included in the multi-agent system 224 that are utilized to complete the set of tasks, and the order in which those agents are employed in the workflow.

Each of the action handlers 228 can be dedicated to a selected action in reply to known categories of user queries including, for example, product inquiries, rate inquiries, and eligibility inquiries. The action handlers 228 operate with a known workflow that leverages the multi agent system 224 through function calls including API calls or calls for other functions available to agentic framework 200 either within the framework or external to the framework. In general, action handlers 228 operate as intermediaries between the various agents to share information. The workflow can include one or a plurality of agents depending on the action. The use of action handlers dedicated to one selected action combined with the operation of the multi-agent system 224 provides a dynamic and highly responsive system. Depending on the action, the action handlers 228 may require operation of one or a plurality of the agents included in the multi-agent system 224. Where multiple agents are employed to complete a given action they may operate sequentially or in parallel. For example, the action handlers 228 can operate to receive an API response from a first large language model included in a first agent and pass that information as an input to a second large language model included in a second agent. When the action (a task or set of tasks) is completed, the action handlers 228 pass the information to the response handler 230. The response handler

230 operates to generate a conversational natural language output that describes the outcome of the action. This can include associated data that is returned, for example, data concerning mortgage products, mortgage rates and mortgage eligibility that are included in a conversational reply. Depending on the embodiment, the quantity and type of agents included in the multi-agent system 224 can differ.

Additional details concerning some of the agents included in the multi-agent system 224 are provided here. For example, the mortgage assistant agent 233 provides a tool that is used to reply to user messages with answers to mortgage questions, explaining pricing, answering questions about the assistant's capabilities, and as the default conversation bot when no other actions are specified. This provides the agentic framework 200 with a domain generalist that can also redirect conversations to other agents in the multi-agent system 224 when, because of a conversation with the user, it identifies a specific action that will assist in providing a more complete reply. Trained for this role, the mortgage assistant can be employed to answer general questions concerning mortgages where a specific intent is not found by the intent classifier 232. In various embodiments, the mortgage assistant agent 233 can be molded to perform a variety of tasks via post parameters such as, "Additional Rules" that allow a developer to add additional behavior rules to the agent's system message prompt, or "Additional Context" which allows the developer to include task specific reference material for the tool.

The column selector agent 237 is used to select columns from electronic files, such as .csv files that organize data in a tabular form. As is described in greater detail below, the column selector agent 237 can be employed to select the columns with data that is most relevant to generate a reply to a user's question. This is advantageous because it can be used to filter for higher value content and reduce the complexity and volume of data that must later be analyzed by or explained to other LLM-based tools including the other agents. According to other embodiments, other dedicated agents can be included for use with file types and databases that organize information differently, and in non-tabular formats. For example, the multi-agent system 224 can include a key selection agent including a large language model to operate with JSON, YAML and other human readable data serialization formats to select (or filter) out specific keys from the JSON or YAML object in response to a text query.

The contextualizer agent 238 uses conversation history to find and replace things like pronouns or abbreviations with the actual information being referenced. This makes the user's query more semantically rich and accurate. This can assist when querying against things like vector databases, where the query should have as much semantic information embedded in it as possible.

The normalization tagger agent 243 is used to normalize the user's query to a standard format, and as illustrated in Table 1, is employed in tasks such as a rate stack search where it is used to categorize the criteria provided by the user. For example, the normalization tagger 243 can categorize a user's criteria into those criteria that are required to meet the user's objectives provided in the query and those criteria that, if available, will optimize the result for the user. In some context, the required criteria are referred to as "hard requirements" and the criteria that will improve the results for the user are referred to as "optimization".

The JSON translator agent 240 takes a user message and a translation schema, then extracts values and returns minified JSON based on the provided translation schema. The JSON that is output can be used in a variety of ways including updating forms on the frontend, or making API requests.

The name extractor agent 241 extracts the name or subject from a message. The name extractor agent 241 is used where operations include saving or loading a loan scenario if the name of the scenario needs to be extracted from the user message and supplied to the relevant API endpoint or function.

The semantic match agent 244 operates to find the best matches in response to a user's natural language query. As is described further below with reference to FIG. 4, the semantic match agent 244 is advantageously employed in combination with the column selector agent 237 and the normalization tagger agent 243. In some embodiments, the semantic match agent 244 operates on structured data, like .csv files.

The near-miss explainer agent 239 is employed with scenario analysis performed by agentic framework 200 to identify mortgage products for which a borrower almost qualifies. The near-miss explainer agent 239 operates to provide information that explains to a user the product or products that they may qualify for and what they must do to qualify.

The rate explainer agent 245 operates to provide information that identifies mortgage products with associated details such as the type of product (fixed rate versus adjustable rate), the interest rate of the product, the term of the product and associated costs as some examples. In some embodiments, the rate explainer agent 245 is employed in combination with the results of a rate stack search to provide the response handler with information that can be included in a natural language response message via the chat widget.

The ineligibility explainer agent 246 is employed with scenario analysis performed by the agentic framework 200 to identify mortgage products for which a borrower is ineligible. In these embodiments, the ineligibility explainer agent 246 can operate to provide the single most important (that is, the easiest to address and/or the most impactful) reason why a mortgage product is ineligible for the borrower. The ineligibility explainer agent 246 can also operate to provide the most important reasons among multiple reasons why a mortgage product is ineligible for the borrower.

Figure 3:
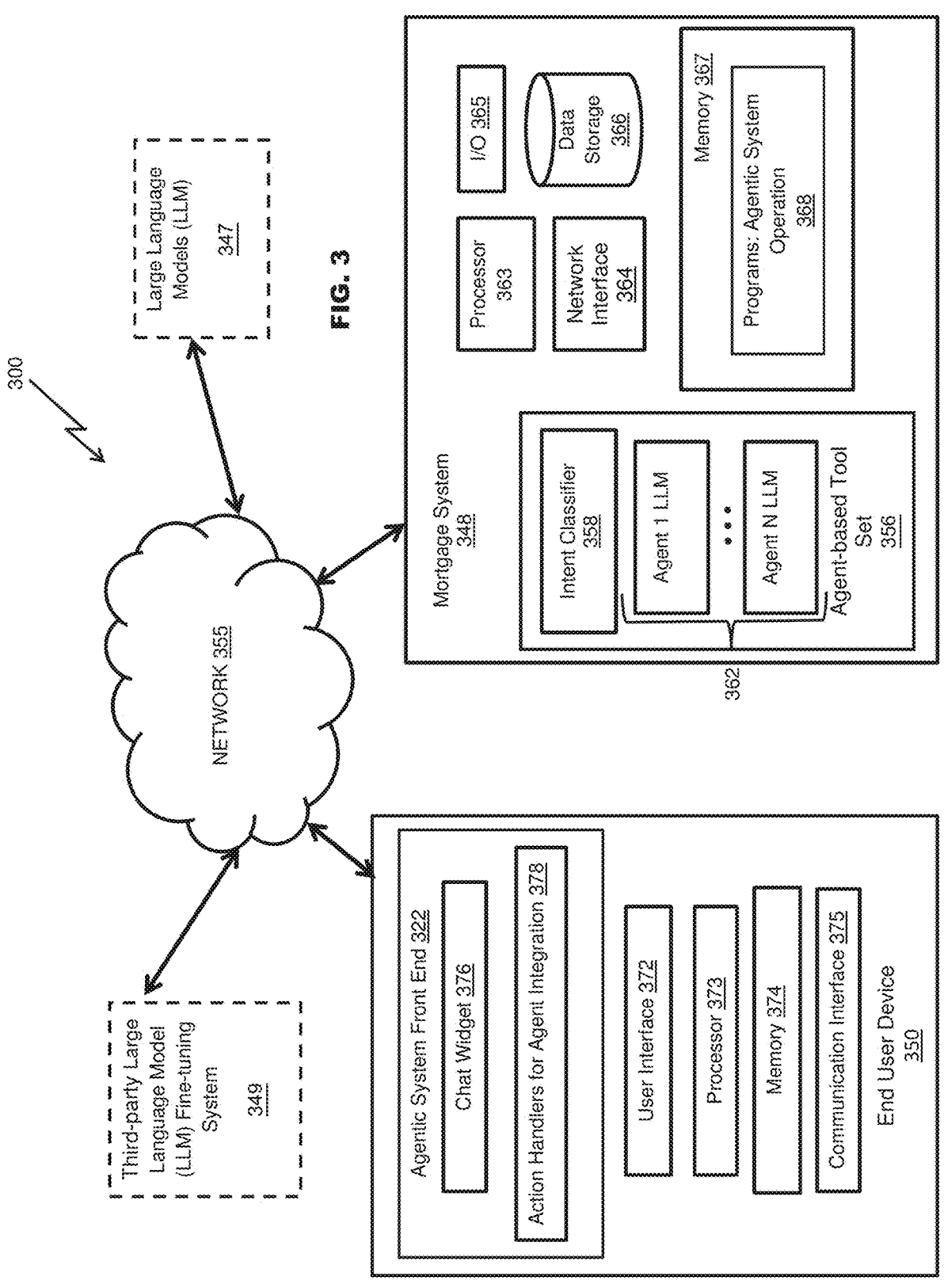
FIG. 3 illustrates a system including a network operating environment for implementing an agent-based AI system in accordance with one embodiment.

Referring now to FIG. 3, a network operating environment for implementing a system 300 including an agentic framework as described herein is illustrated in accordance with various embodiments. The system 300 includes a mortgage system 348 as an example to describe the functionality and operation of the system. However, those of ordinary skill in the art will recognize based on the disclosure provided herein that the system 300 can be employed in a similar fashion in other fields. The system 300 also includes an end user device 350 that is a representative example of an end user device where each of a plurality of end users (for example, loan officers) employs their end user device, respectively, to access the resources provided by the mortgage system 348. The system 300 can support access by any number of end user devices 350. Depending on the embodiment, the system 300 can also integrate external resources, for example, large language models 347 (including third party general purpose LLMs) and third-party LLM fine tuning systems 349.

According to the illustrated embodiment, the mortgage system 348 includes an agent-based tool set 356 that includes an intent classifier 358 and a plurality of AI agents 362. The quantity of AI agents 362 can vary and can include any number of AI agents depending on the embodiment (represented here as Agents 1-N). The intent classifier 358 and the plurality of AI agents 362 each includes a large language model, respectively. The mortgage system also includes a processor 363, a network interface 364, I/O 365, data storage 366, and a memory 367. In general, the memory 367 stores computer programs 368 that include software instructions for execution by the processor 363. The processor 363 can include one or a plurality of processors.

Depending on the embodiment, the mortgage system 348 can include one or more of a variety of computing devices such as a general purpose computer such as a PC, a laptop, a tablet computer, or other computing device. The resources included in the mortgage system 348 can be hosted on one or more servers accessible to the system operator and users via the network 355. In various embodiments, the resources included in the mortgage system 348 are hosted on servers located at one or a plurality of sites. The mortgage system 348 can be hosted by the entity that delivers the services and resources provided by the mortgage system or by a third-party server host.

The network interface 364 is employed for communication between the mortgage system 348 and other elements connected to the network 355 including the end user computing devices 350 and the external resources 347, 349. In general, the network 355 can include either or both of local-area networks (LANs), wide area networks (WANs), wireless communication, wired communication and may include the Internet. The network 355 provides access to one or more remote devices, servers, application resource management and/or data storage systems. For example, the network 355 can allow communication between any of a plurality of end user devices 350 and the mortgage system 348. In general, the system 300 provides for communication of the illustrated components with one another and/or with any of the other resources and devices coupled to the network 355. Communication can occur using any of Wi-Fi networks, Bluetooth communication, cellular networks, satellite communication, and peer-to-peer networks available either alone or in combination with one another via the network 355. Depending on the embodiment, the network 355 may be any type and/or form of network known to those of ordinary skill in the art capable of supporting the operations described herein. Thus, other communication protocols and topologies can also be implemented in accordance with various embodiments.

The memory 367 provides a non-transitory machine readable storage media which is coupled to the processor 363. The memory 367 can store the computer programs 368 that when executed by the processor 363 provide for operation of the agent-based tool set 356 and delivery of a front end to users on their end user device 350. The front end allows for an interactive set of operations by which the user can access and utilize the agent-based tool set 356, for example, via a conversational dialog available through a display included in the end user device 350. According to the illustrated embodiments, the programs 368 direct all aspects of the agentic system operation.

The I/O 365 can include any of the display in which a user interface is presented to the user (for example a developer or a system administrator), a keyboard, a mouse, a touchscreen controller where, for example, the display is a touchscreen display, or alternatively, a trackpad or mouse used to move a cursor within a user interface such as a GUI. According to further embodiments, the I/O can include an audio system employed with a speech recognition system to allow hands-free interaction with the GUI.

According to some embodiments, the data storage 366 stores information concerning various aspects of the mortgage system 348, for example, information on mortgage products, mortgage rates and mortgage costs. Depending on the embodiment, the data storage 366 can include any of a relational database, object-oriented database, unstructured database, or other database. Further, the data storage 366 can be included in any aspect of a memory system, such as in RAM, ROM, or disc, and may also be separately stored on one or more dedicated data servers included in the mortgage system 348. The elements included in the mortgage system 348 are coupled to one another with an internal communication system (not illustrated) to allow for a transfer of data, execution of commands, or exchange of messages within the system 348.

According to the illustrated embodiment, the end user device 350 is a computing device that includes a user interface, for example, a graphical user interface. In overall operation, the system 300 is employed to provide a set of services to the respective end users as is described herein. The end user device 350 can include any type of computing device suitable for communicating with the mortgage system via the network 355. Accordingly, the end user device 350 can include one or more of a variety of computing devices, for example, a general purpose computer including a mobile phone, a PC, a laptop, a tablet computer or other computing device. The end user device 350 is representative of the devices employed by end users to access the resources provided by the mortgage system 348 as well as any other external resources employed in the system 300.

The end user device 350 includes an agentic system front end 322, a user interface 372, a processor 373, a memory 374 and a communication interface 375. According to the illustrated embodiment, the agentic system front end 322 includes a chat widget 376 and action handlers for agent integration 378. In general, the action handlers 378 are utilized to coordinate the execution of tasks performed by the agent based tool set 356, for example, by generating API calls to agents and handling API responses as needed to complete a workflow.

The elements of the end user device 350 can be configured like corresponding elements of the mortgage system 350. Depending on the embodiment, the user interface 372 can include a display in combination with a keypad, a mouse, a touchscreen, a speaker, and/or a microphone to allow the user to interact with the agentic system front end 322. The communication interface 375 can include a wired or a wireless interface, for example, including a Wi-Fi and/or BLUETOOTH system to enable communication with other elements of the system 300 over the network 355. The processor 373 can include one or more central processing units (CPUs), graphic processing units (GPUs), field-programmable gate arrays (FPGAs) or application-specific integrated circuits (ASICs) either alone or in combination with one another depending on the embodiment. The memory 374 includes a non-transitory machine-readable storage media which is coupled to the processor 373 to provide information, data and instructions accessible for use and, in the case of instructions, execution by the processor 373.

Depending on the embodiment, the system 300 can be employed to complete a variety of different workflows (for example, as pre-defined in an associated action handler) using an agent or agents 362 included in the agent-based tool set 356 to complete specialized tasks. These workflows can include, for example, any of: a search of a mortgage rate stack; generating a response to an eligibility request or an explanation why a product is currently ineligible; providing an identification of products for which a borrower nearly qualifies (referred to as "near miss analysis") with an explanation on adjustments that will make the product eligible; providing a response to a request for recommendations to improve product pricing; saving a loan scenario; loading a loan scenario; updating a loan scenario form; and replying to general mortgage or web application questions.

Figure 4:
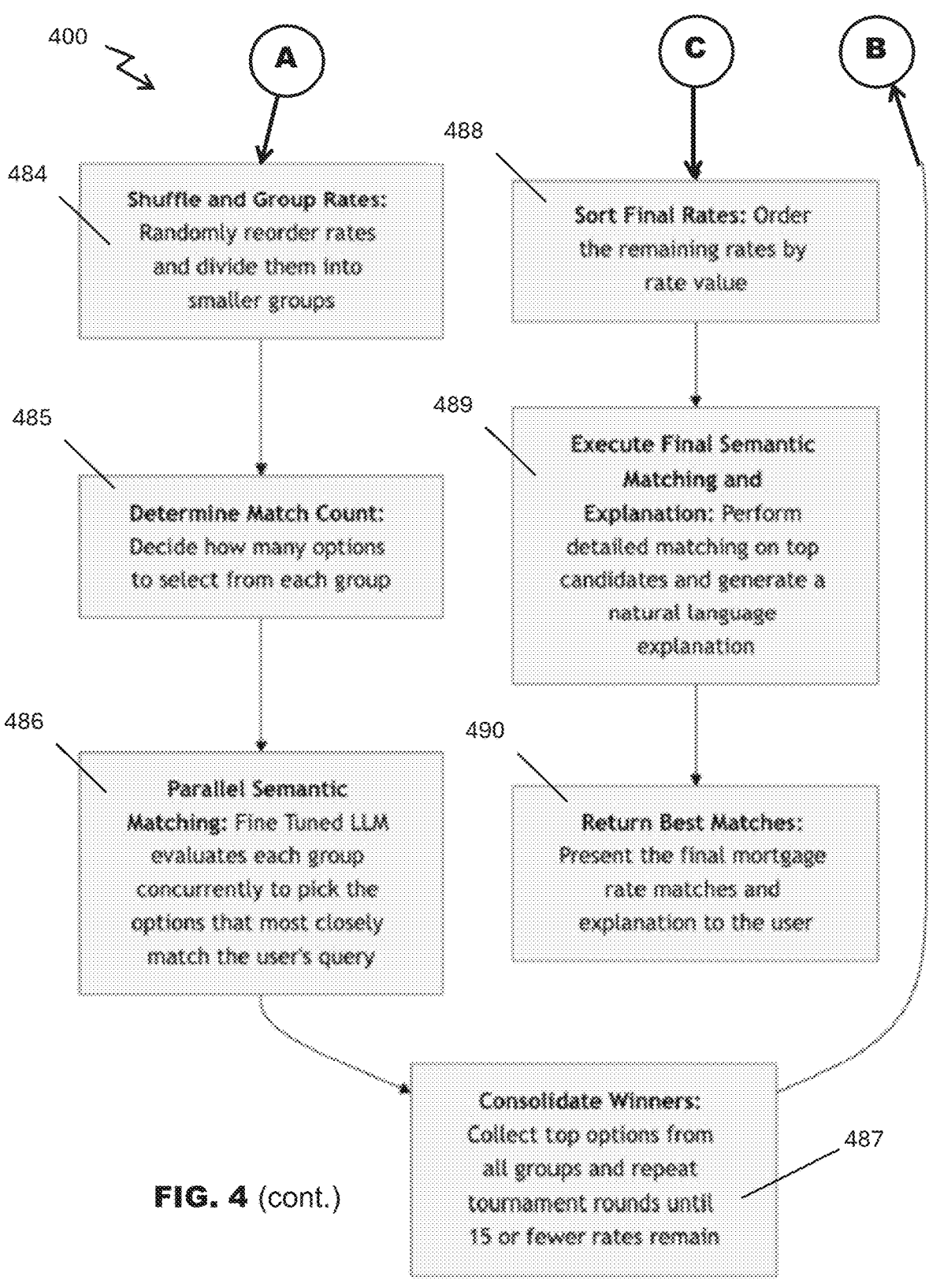
FIG. 4 illustrates a flow diagram of a process employing an agent-based AI system in accordance with one embodiment.

Operation of the system 300 will now be described with reference to FIG. 4 as an example of a process 400 employing the semantic match agent included in the agent-based tool set 356. In this example, the process 400 involves a loan officer with an end user device 350 in communication with the mortgage system 348. In some embodiments, the mortgage system 348 implements a frontend on the end user device including a chat widget, an action router, action handlers and a response handler. In other embodiments one or more of the action handlers 228, 378, action router 226 and response handler 230 are provided in the mortgage system 348 for remote access by the loan officer via the network 355.

The loan officer employs the chat widget 376 to submit a natural language query about mortgage rates and conditions at block 480. For purposes of this example, the user query includes "we want the lowest rate but the borrower can only afford to buy down up to $5K." The query is received by the intent classifier 358 where it is processed by the associated large language model to determine intent and corresponding action that the mortgage system is being asked to complete by the loan officer. The intent classifier's large language model provides a response including an intent, here "explain pricing," and an action key which is provided to the action router 226. The action key identifies the action handler, here the "semantic match" action handler. The semantic match action handler 244 includes the set of actions, associated logic and an identification of the agents and workflow to complete the task. As illustrated by the process 400, action handlers can orchestrate multiple rounds of calls to the large language models included in the agents or to frontend functions. The action handler receives the API responses from the agents and responses from the frontend functions for further processing in the overall workflow.

For example, at block 481, the workflow results in the user query being sent to the normalization tagger agent 243 included in the agent-based tool set 356. The normalization tagger 243 standardizes and tags the query with requirements and optimizations using a mortgage domain dictionary included in the mortgage system 348. The results of the tagging generally include at least one of a tagged requirement or a tagged optimization that can be employed with other large language models included with other agents in the tool set 356. Depending on the content of the query, the tagging can also generate multiple requirements and/or multiple optimizations. Here, the results of the normalization tagger agent 243 provides two tagged optimizations "lowest RATE (OPTIMIZATION) with CREDIT/COST around 5000 (OPTIMIZATION)."

The results of the tagging are returned to the action handler 238, 378. At block 482, they are passed by the action handler to the column selector agent 237 as input to the large language model included in this agent. In various embodiments, the column selector agent 237 generates an output that identifies a location of the any columns that include data that is relevant to completing the action for reply to the user message at block 482. In this example, the column selector agent 237 is configured to operate with electronic data that is stored in a tabular arrangement, for example, information saved in .csv files. These file structures allow a search for relevant columns. In this example, the column selector agent provides an output from the associated large language model that identifies two columns "rate" and "credit cost."

A user interface 500 is illustrated in FIG. 5 that provides a representative example in accordance with some embodiments. The user interface 500 includes a set of search results based on relevant information provided by the loan officer. These search results reflect a search that was conducted for a conventional, fixed rate mortgage with a 30 day rate lock based on a $300,000 purchase and a loan to value ratio of 60%. The preceding criteria were included in a search for mortgage products for purchase of a condominium located in Greenlee, Arizona by a borrower having a FICO score of 620. A plurality of eligible products 552 is displayed in the user interface 500. Because the search results can include hundreds of eligible products, the user interface 500 illustrated in FIG. 5 only displays a portion of the eligible products included in the search results. The products are displayed in a tabular format with each of the individual products 552 providing a single record in the larger data set that forms the entirety of the eligible products identified in the search. The search can be performed on hundreds or thousands of records included in a rate stack with the search results including dozens of records (in this case eligible products). The user interface includes for each record a set of product information that includes: Rate; Price; P&I; Credit/Cost and Lock Period available for each record along with other information that is not relevant for this mortgage product category. The product information is presented in columns. This data is also organized in tabular fashion when saved in an electronic file, for example, a .csv file.

The action handler 238, 378 passes the output including the .csv contents of the two identified columns to the large language model of the semantic match agent 244 to begin processing at block 483. In general, the semantic match agent 244 operates to iteratively process subgroups of candidate records from the rate stack (those selected because the information in the relevant columns meets the requirements and/or optimizations) identified from the user query. A determination is made at block 483 concerning the number of records to include in each subgroup. Then, before beginning sorting, the eligible products are shuffled to place them in a random order before dividing them into subgroups having the desired record-count at block 484. A match-count is determined at block 485. The match-count establishes the quantity of records to select from each subgroup at each iteration of the semantic matching process. An initial semantic matching operation is performed concurrently for each of the current subgroups at block 486. In some embodiments, each of the large language model included in the semantic match agent is fine-tuned to deliver improved results, for example, each of the normalization tagger agent 243, the column selector agent 237 and the semantic match agent 244. In other embodiments, only some of the agents are fine-tuned, for example, the normalization tagger agent 243 and the semantic match agent 244. The concurrent semantic matching at block 486 results in a selection of the top option (those records that most closely match the user's query) or options among the records included in each subgroup. The quantity of records selected from each sub-group is determined by the match count established at block 485. At block 487, the top options from each of the subgroups are collected to provide a set of candidate records that is reduced in number relative to the record-count at the first iteration.

The semantic match agent performs a tournament style semantic match. Provided that the total quantity of candidate records is greater than the size of the subgroup, the process 400 continues with the remaining candidate records shuffled to randomly reorder them before dividing them into subgroups again at block 484. The match-count can remain the same or be adjusted at block 485. The semantic matching operation is again performed concurrently for each of the current subgroups at block 486. The concurrent semantic matching at block 486 results in a selection of the option(s) among the remaining candidate records included in each subgroup. At block 487, the top candidate records from each of the subgroups are collected to provide a second set of candidate records that is reduced in number relative to the record-count of the first set of candidate records. The acts performed at blocks 483, 484, 485, 486 and 487 are repeated until the total quantity of remaining candidate records is reduced to the size of the subgroup as originally established at block 483.

Once the quantity of remaining candidate records is reduced to the size established for the subgroups, the process 400 continues. According to the illustrated embodiment, a final sort of the remaining candidate records sorted by their interest rate is prepared at block 488 before a final semantic matching is performed. At block 489, a final round of the semantic matching tournament is performed on the top remaining candidates using a detailed approach to best distinguish between the remaining candidates. At block 490, the large language model included in the semantic match agent 244 completes the semantic sort and generates a natural language explanation of the result. These are included in an API response returned to the action handler 228, 378. The action handler 228, 378 passes the response to the response handler which generates a conversational natural language output describing the selected options including information concerning the interest rate and the cost to the borrower.

Because the final round is performed on a limited quantity of top candidates, the very best among all available candidates, the selection of the set of candidate records to include in the results presented to the user has a higher degree of difficulty relative to the selections made in the earlier tournament rounds. According to one embodiment, the capabilities of the large language models employed at different stages can differ based on the stage of the tournament in which the large language model is being employed. For example, a lower cost, faster, but less powerful large language model can be employed during the tournament phase of the process 400. Then, a much more expensive, slower, and more powerful large language model can be employed for the final round to more effectively select the best options from among those remaining. This supports a more detailed analysis at the final round, if that is necessary.

In various embodiments, the large language model in one or more agents can be fine-tuned with training data. For example, in one embodiment, both the normalization tagger agent 243 and the semantic match agent 244 are separately trained in a process of fine-tuning their operation. In each case, the training data for fine tuning includes multiple different examples that each include a system message, a user message as received by the large language model employed by the agent, and a corresponding response or output message generated by the large language model. For the normalization tagger agent 243, the system message describes how to perform the job of normalizing and tagging the user query, the user message is the raw user query as received by the system, and the output message provided by the agent 243 is the normalized and tagged user query. Table 2, presented below, provides an example of the form and content of training data employed in fine tuning the normalization tagger agent 243. The information presented in Table 2 is a single training example, but in practice, a larger set of different examples having the same general format are included for the training. Each example includes a system message, user message and resulting output or agent response message.

TABLE 2

| SYSTEM MESSAGE | Normalization Tagger: Your job is to tag and translate requirements in a user query and return the query in as close to the original format as possible<br>   - Please examine the user query and identify any HARD REQUIREMENTS<br>   - HARD REQUIREMENTS are things like "Price within 2 basis points of par", "has up to $5k to buy down", "at least", "at most", "only has", "up to", "above", "less than", etc.<br>   - Also identify any OPTIMIZATIONS. These are things like "best", "top", "around", "close to", "lowest", "highest", "cheapest", "most expensive", etc.<br>   - Return the query with TAGGED HARD REQUIREMENTS and OPTIMIZATIONS.<br>   - To TAG an item append (HARD REQUIREMENT) or (OPTIMIZATION) to the end of the item.<br>   - Make any criteria identified/translated from the glossary ALL CAPS. (lowest rate -> lowest RATE(OPTIMIZATION)) (rate around 5.45 -> rate around 5.45(OPTIMIZATION))<br>   - Never ask questions or respond to the user query.<br>   - Only tag and translate the user query.<br>   - TRANSLATE language to common terms using the provided GLOSSARY<br>   Here is the GLOSSARY: |
| USER MESSAGE | Yeah, he really needs the lowest monthly payment he can get. He can buy down up to 7920. |
| OUTPUT/RESPONSE MESSAGE | lowest PRINCIPAL AND INTEREST(OPTIMIZATION) with CREDIT/COST below 7920(HARD REQUIREMENT) |

For the semantic match agent 244, the system message describes how to perform the job of semantic matching, the user message received by the semantic match agent 244 is the normalized and tagged user query as output by the normalization tagger agent 243, and the output message provided by the semantic match agent 244 returns the records (for example, csv rows) that it selects as the best match to the user query. Table 3, presented below, provides an example of the form and content of training data employed in fine tuning the semantic match agent 244. The information presented in Table 3 is a single training example, but in practice, a larger set of different examples having the same general format are included for the training.

Each example includes a system message, user message and resulting output or agent response message. The training data provides various combinations of selected columns, different requirements and optimizations in the user query, results with better matches or worse matches relative to the input data, and various MATCH_COUNT parameter values, to generalize this behavior for future use-cases. In the example provided by Table 3, the user or output message includes ten records 1266, 5160, 7305, 8196, 8031, 8724, 9186, 9318, 8790, and 11034. The output message returns the identification of the Rate ID for two of the products that were considered best matching in this example, that is, 8196 and 8031.

TABLE 3

| SYSTEM MESSAGE | Closest Match OPTION Selector: You compare OPTIONS to a given QUERY and determine the closest matching OPTIONS based on the criteria in the QUERY.<br>   Rules for OPTION Selection:<br>   - Please examine the given OPTIONS and identify the top MATCH_COUNT that most closely match the QUERY.<br>   - Always prioritize HARD REQUIREMENTS over OPTIMIZATIONS.<br>   - If the QUERY lists HARD REQUIREMENTS, the chosen OPTIONS must meet all of them. Simply Ignore any OPTIONS that do not.<br>   - If the QUERY lists OPTIMIZATIONS, the OPTIONS should get as close to them as possible.<br>   - You must account for all OPTIMIZATIONS and HARD REQUIREMENTS in the QUERY.<br>   - If given a statement like "lowest cost(OPTIMIZATION) with principal and interest above 1600(HARD REQUIREMENT)", you can think of your criteria as ["HARD REQUIREMENT: principal and interest above 1600", "OPTIMIZATION: lowest cost"]<br>   - Understand that CREDIT and COST exist on a continuum, meaning a positive value for CREDIT is actually a negative COST, and vice versa.<br>   - The OPTIONS are provided in CSV format, with each option on a new line.<br>   - Given the CSV format of the OPTIONS, you can use the first line to identify the column names when considering different criteria. |

TABLE 3-continued

|  |  |
|---|---|
|  | - It's crucial to understand that each OPTIMIZATION or HARD REQUIREMENT corresponds to a column in the CSV OPTIONS.<br> - Your response should be an array containing the Rate ID of the MATCH_COUNT closest matches. ex: [3, 8]<br>  - Please list the chosen Rate IDs in ranked order, with the closest match first.<br>  - Never say anything or respond with anything other than a list of MATCH_COUNT integers. |
| USER MESSAGE | MATCH_COUNT: 2\nQUERY: COST around $10,700(OPTIMIZATION) with a RATE around 6.20%(OPTIMIZATION)\n\nOPTIONS: RATE ID,PRODUCT,RATE (Percent), PRICE (Basis Points),PRINCIPAL AND INTEREST (Dollars), CREDIT (Dollars), COST (Dollars), Lock Period (Days)\n1266,VA 30,5%,91.25 points, $1,630,0,26578,30\n5160,SR CanadaAbode VA 30,5.875%,95.378 points,$1,796,0,14039,30\n7305,SR Galaxy Shop VA 30,6.125%,95.808 points,$1,845,0,12733,30\n8196,JR Macaroni VA 30,6.25%,96.326 points, $1,870,0,11159,30\n8031,SR CanadaAbode VA 30,6.25%,96.698 points, $1,870,0,10029,30\n8724, VA 30 (Homestead),6.25%,96.821 points,$1,870,0,9656,30\n9186,SR Ms Johnson VA 30,6.375%,96.222 points, $1,895,0,11475,30\n9318,SR CanadaAbode C 30 PTQER,6.375%,95.095 points,$1,871,0,14715,30\n8790,FHA 30,6.375%,97.375 points, $1,904,0,8012,30\n11034, VA 30 Bardolph,6.625%,95.875 points,$1,944,0,12529,30\n. |
| OUTPUT MESSAGE | [8196, 8031] |

Using a combination of the fine-tuning of large language models and multiple tournament rounds performed in a semantic match, various embodiments described herein overcome technical problems found with prior approaches that utilize large language models. For example, traditional searches that simply identify items similar to an input query, for example, by searching a vector database utilizing a nearest-neighbor algorithm cannot effectively perform a semantic search to identify numeric values that meet an objective provided in a text query. The stochastic nature of large language models as used conventionally does not provide a deterministic result that can be relied upon in these circumstances. However, the embodiments described herein use fine-tuning to train the large language model to deliver results that more accurately identify records that meet objective(s) established in a user query where the identification requires a contextual understanding of a relationship between the query and a way a record can meet the objective(s) even when it is not an exact fit. Embodiments provided herein can identify contextually important "best matching" results even where they do not provide an exact fit. The use of a tournament process improves the results of the semantic matching further because the evaluation of records together in different random combinations in an iterative process provides greater opportunity to identify those records that are truly the best matching in context.

Figure 6:
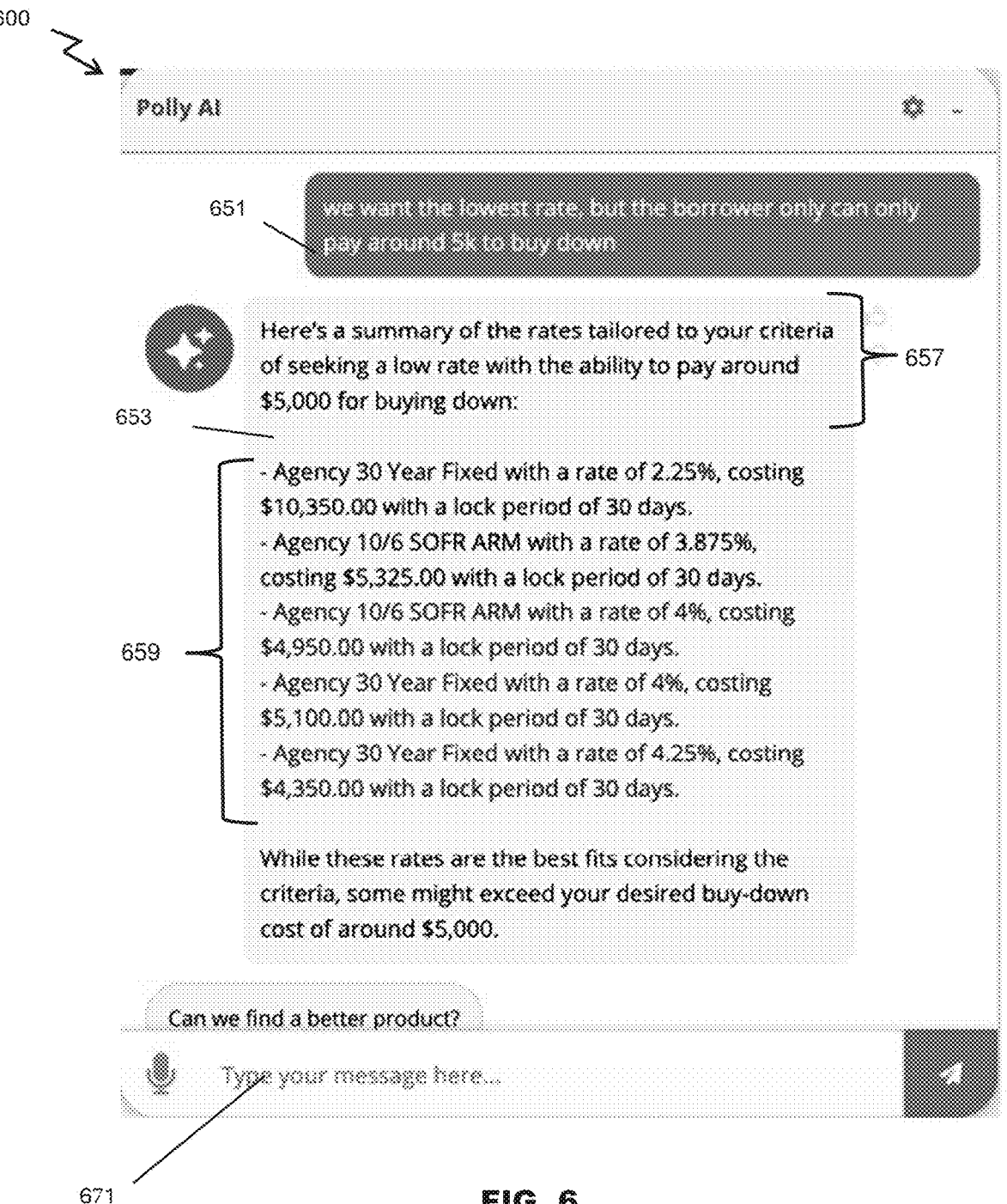
FIG. 6 illustrates a graphical user interface including a chat widget employed in an agent-based AI system according to one embodiment.

Referring to FIG. 6, a user interface 600 for a chat widget is illustrated in accordance with one embodiment. The user interface 600 includes message entry field 671, a user message display field 651, and a system response display field 653. The message displayed in the system response field 653 in FIG. 6 includes a first conversational reply 657 and a second conversational reply 659 with a set of search results 660. The first conversational reply 657 explains the results of the search 660 in context. The second conversational reply 659 provides a prompt that adds context for the user. The example illustrated in FIG. 6 shows a portion of a natural language conversation conducted between a user and the mortgage system 348 using the chat widget 376. This example is representative of a user query that initiates actions involving a rate stack search. The user interface 600 also includes a system prompt 661. The system prompt 661 is another natural language prompt provided here to further aid the loan officer now that the results of the requested search are provided. In this example, the system prompt 661 may result in a user message entered in the message entry field 671 requesting a follow-on search of the rate stack.

Although the embodiments described herein refer to a mortgage system 348 including an agent designated as a mortgage assistant, those of ordinary skill in the art will recognize based on the disclosure herein that such an agent is a domain-specific tool that, according to other embodiments, can be replaced with an agent with expertise in a different domain. According to these embodiments, the agent can be included in a system to perform tasks similar to those described herein but in a different field. For example, the agents can be trained with data that facilitates workflows that have sets of predetermined tasks that are performed to complete actions in response to user queries directed to fields other than the mortgage field. As one example, a generalist agent can be trained using training data in a field other than mortgages.

According to some embodiments, a web hosted service with resources including an agent-based tool set 356 and system 348 as illustrated and described herein can be employed in combination with the agentic system front end 322 including chat widget 376 and action handlers for agent integration 378 in a system directed to other industries and fields. For example, the service can be provided for use in any of a medical patient record system, a law firm case management system, and a grocery store inventory and logistics system. The resources and system elements described herein can, for example: employ a contextualizer agent to enrich patient statements during transcription; complete patient record data by employing the chat widget to directly receive a patient's answers for processing by the multi-agent system; employ a semantic match agent to accurately identify patients who match a selected diagnosis or set of complaints to evaluate and improve treatments; and replace the mortgage assistant with a medical assistant to answer medical knowledge questions or provide practice guidance. As another example, the methods and systems described herein can be employed in banking, for example, with a bank customer accessing the system resources from their computing device via the front end for the agentic system. In this embodiment, the customer can log into the system, ask questions about their checking account balance, the system operating with the intent classifier identifying an action handler, the action handler sending an API request and retrieving data, and the chat widget responding with an answer. Banking operations can also advantageously use the embodiments described herein to assist bank personnel. In one approach banking personnel have the ability to utilize the front end in combination with the agent tool set to search for a particular customer account without needing the actual account number, for example, using a semantic match agent, a column selection agent, and normalization tagger agent.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. Performing searches of a mortgage rate stack and orchestrating operations of a multi-agent system including multiple different large language models to complete tasks in a workflow responsive to a user query provide two such examples.

Each computer program within the scope of the claims below may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method generating responses to messages provided by a plurality of users via a chat widget operating on a user computing device, respectively, the messages provided in a natural language and directed to a multi-agent system remote from the respective user computing device, the multi-agent system including a plurality of agents each of the plurality of agents including a respective large language model, the method comprising:

on receipt of a message provided by a user included in the plurality of users, the message including a request to perform an action using the multi-agent system, performing acts of:

(a) classifying, by one or more processors, with a first large language model included in a first agent included in the multi-agent system, an intent of the request and associating the intent with a corresponding action, the first large language model configured to receive the message as a text input;

(b) identifying, with the first large language model, an action handler from among a plurality of available action handlers based on the intent, and sending, from the first large language model, to an action router operating on the user computing device, a response including a key that uniquely identifies the action handler from among a plurality of available action handlers, the action handler designated to handle the request and coordinate operations of the multi-agent system to complete the corresponding action with a workflow defined by the action handler, the workflow including a predetermined set of tasks that are established in advance independent of an operation of the first large language model and independent of an operation of any of the respective large language models, the predetermined set of tasks for completion by a predefined set of agents included in the plurality of agents in a predefined order, where each of the predetermined set of tasks, each of the predefined set of agents and the predefined order, respectively, are established in advance by the action handler for the intent and corresponding action, independent of an operation of the action handler subsequent to the receipt of the message;

(c) completing the workflow, at least in part, with the action handler generating function calls directed to the multi-agent system and processing API responses received from the multi-agent system to complete tasks included in the predetermined set of tasks;

(d) on a completion of the workflow, sending information output from an agent included in the multi-agent system to the action handler, the action handler routing the information to a response handler operating on the user computing device, the response handler processing the information to generate a conversational output shared with the user via the chat widget; and (e) repeating acts (a)-(d) for each message received from respective users included in the plurality of users, each message included in a plurality of messages received from the plurality of users;

for each message included in the plurality of messages for which the intent that is identified at act (a) matches the intent of a different message included in the plurality of messages:

identifying the action handler at act (b) as a selected action handler that is the same as identified for others of the different messages having the matching intent, the selected action handler coordinating operations of the multi-agent system to complete the corresponding action with the same workflow defined by the selected action handler, the workflow including the predetermined set of tasks that match those identified for completion for others of the different messages having the matching intent; and for each message included in the plurality of messages for which the intent that is identified at act (a) differs from the intent identified for others of the different messages:
identifying the action handler at act (b) that is a different action handler than the selected action handler, the different action handler coordinating operations of the multi-agent system to complete the corresponding action with the workflow defined by the selected action handler, the workflow including the predetermined set of tasks that differ from those identified for completion for the different messages having a different intent.

2. The method of claim 1, wherein the action handler is a first action handler, wherein the workflow is a first workflow, wherein the set of predetermined tasks is first set of predetermined tasks, wherein the multi-agent system includes a plurality of agents dedicated to a performance of a specific set of tasks for different workflows, respectively and including a respective large language model, and wherein the method further comprises if the first large language model is unable to identify, with the processing of the text input, an action handler associated with one of the plurality of agents, selecting a second action handler to coordinate operations of a generalist agent of the multi-agent system to respond to the message including a query concerning at least one of a question concerning capabilities of the multi-agent system and a question generally concerning mortgages.

3. The method of claim 2, wherein the different workflows are associated with the plurality of agents dedicated to the performance of a specific set of tasks included in workflows established to address user messages concerning at least one of a search of a mortgage rate stack, product eligibility, product pricing, and a saving of a loan scenario.

4. The method of claim 1, further comprising fine tuning the first large language model using sets of training data including input messages with queries concerning mortgage product selection, system messages corresponding to the queries and intent classification messages corresponding to the queries.

5. The method of claim 1, further comprising providing a front end employed to access the multi-agent system from the user computing device, the front end including each of the action handler in combination with the chat widget, the action router, and the response handler.

6. The method of claim 1, further comprising fine tuning at least one language model included in the multi-agent system using training data including system messages to establish the functionality of the large language model, user messages in a form received by the large language model, and response messages output by the large language model.

7. A system comprising:
one or more processors configured to:
provide a user computing device with a frontend of a multi-agent system, the multi-agent system including a plurality of agents, the front end including a chat widget, a plurality of action handlers, an action router and a response handler;
receive, by the one or more processors, a message provided by a user with the chat widget, the message provided in a natural language and concerning mortgage products;
performing, by the one or more processors, an intention classification with a first large language model included in a first agent included in the plurality of agents, the first large language model configured to receive the message as a text input, the intention classification associating an intent of a request provided by the message with a corresponding action;

sending, from the first large language model, to an action router operating on the user computing device, a response including a key that uniquely identifies an action handler from among the plurality of action handlers, the action handler designated to coordinate operations of the multi-agent system to complete the corresponding action with a workflow defined by the action handler, the workflow including a predetermined set of tasks, the predetermined set of tasks for completion by a predefined set of agents included in the plurality of agents in a predefined order, where each of the predetermined set of tasks, each of the predefined set of agents and the predefined order, respectively, are established in advance by the action handler for the intent and corresponding action, independent of an operation of the action handler subsequent to the receipt of the message;
completing the workflow, at least in part, with the action handler generating function calls directed to the multi-agent system and processing API responses received from the multi-agent system to complete tasks included in the predetermined set of tasks; and
on a completion of the workflow, sending information output from an agent included in the plurality of agents to the action handler, the action handler routing the information to a response handler operating on the user computing device, the response handler processing the information to generate a conversational output shared with the user via the chat widget.

8. The system of claim 7, wherein the action handler is a first action handler,
wherein the workflow is a first workflow, wherein the set of predetermined tasks is first set of predetermined tasks,
wherein each of the plurality of agents is dedicated to a performance of a specific set of tasks for different workflows, respectively and including a respective large language model, and
wherein the one or more processors is configured to:
if the first large language model is unable to identify, with the processing of the text input, an action handler associated with one of the plurality of agents, selecting a second action handler to coordinate operations of a generalist agent of the multi-agent system to respond to the message including a query concerning at least one of a question concerning capabilities of the multi-agent system and a question generally concerning mortgages.

9. The system of claim 8, wherein the different workflows are associated with the plurality of agents dedicated to the performance of a specific set of tasks included in workflows established to address user messages concerning at least one of a search of a mortgage rate stack, product eligibility, product pricing, and a saving of a loan scenario.

10. The system of claim 7, wherein the processor is configured to fine tune the first large language model using sets of training data including input messages with queries concerning mortgage product selection, system messages corresponding to the queries and intent classification messages corresponding to the queries.

11. A non-transitory computer readable storage medium storing instructions that when executed by one or more processors causes the one or more processors to perform operations for generating responses to messages provided by a plurality of users via a chat widget operating on a user computing device, respectively, the messages provided in a natural language and directed to a multi-agent system remote from the respective user computing device, the multi-agent system including a plurality of agents each of the plurality of agents including a respective large language model, the operations comprising:

on receipt of a message provided by a user included in the plurality of users, the message including a request to perform an action using the multi-agent system, performing acts of:

(a) classifying, by one or more processors, with a first large language model included in a first agent included in the multi-agent system, an intent of the request and associating the intent with a corresponding action, the first large language model configured to receive the input-message as a text input;

(b) identifying, with the first large language model, an action handler from among a plurality of available action handlers based on the intent, and sending, from the first large language model, to an action router operating on the user computing device, a response including a key that uniquely identifies the action handler from among a plurality of available action handlers, the action handler designated to handle the request and coordinate operations of the multi-agent system to complete the corresponding action with a workflow defined by the action handler, the workflow including a predetermined set of tasks that are established in advance independent of an operation of the first large language model and independent of an operation of any of the respective large language models, the predetermined set of tasks for completion by a pre-defined set of agents included in the plurality of agents in a predefined order, where each of the predetermined set of tasks, each of the predefined set of agents and the predefined order, respectively, are established in advance by the action handler for the intent and corresponding action, independent of an operation of the action handler subsequent to the receipt of the message;

(c) completing the workflow, at least in part, with the action handler generating function calls directed to the multi-agent system and processing API responses received from the multi-agent system to complete tasks included in the predetermined set of tasks;

(d) on a completion of the workflow, sending information output from an agent included in the multi-agent system to the action handler, the action handler routing the information to a response handler operating on the user computing device, the response handler processing the information to generate a conversational output shared with the user via the chat widget; and (e) repeating acts (a)-(d) for each message received from respective users included in the plurality of users, each message included in a plurality of messages received from the plurality of users;

for each message included in the plurality of messages for which the intent that is identified at act (a) matches the intent of a different message included in the plurality of messages:

identifying the action handler at act (b) as a selected action handler that is the same as identified for others of the different messages having the matching intent, the selected action handler coordinating operations of the multi-agent system to complete the corresponding action with the same workflow defined by the selected action handler, the workflow including the predetermined set of tasks that match those identified for completion for others of the different messages having the matching intent; and for each message included in the plurality of messages for which the intent that is identified at act (a) differs from the intent identified for others of the different messages:

identifying the action handler at act (b) that is a different action handler than the selected action handler, the different action handler coordinating operations of the multi-agent system to complete the corresponding action with the workflow defined by the selected action handler, the workflow including the predetermined set of tasks that differ from those identified for completion for the different messages having a different intent.

12. The non-transitory computer readable medium of claim 11, wherein the action handler is a first action handler, wherein the workflow is a first workflow, wherein the set of predetermined tasks is first set of predetermined tasks, wherein the multi-agent system includes a plurality of agents dedicated to a performance of a specific set of tasks for different workflows, respectively and including a respective large language model, and wherein the operations further comprise if the first large language model is unable to identify, with the processing of the text input, an action handler associated with one of the plurality of agents, selecting a second action handler to coordinate operations of a generalist agent of the multi-agent system to respond to the message including a query concerning at least one of a question concerning capabilities of the multi-agent system and a question generally concerning mortgages.

13. The non-transitory computer readable medium of claim 12, wherein the different workflows are associated with the plurality of agents dedicated to the performance of a specific set of tasks included in workflows established to address user messages concerning at least one of a search of a mortgage rate stack, product eligibility, product pricing, and a saving of a loan scenario.

14. The non-transitory computer readable medium of claim 11, wherein the operations further comprise fine tuning the first large language model using sets of training data including input messages with queries concerning mortgage product selection, system messages corresponding to the queries and intent classification messages corresponding to the queries.

15. The non-transitory computer readable medium of claim 11, further comprising providing a front end employed to access the multi-agent system from the user computing device, the front end including each of the action handler in combination with the chat widget, the action router, and the response handler.

16. The non-transitory computer readable medium of claim 11, further comprising fine tuning at least one language model included in the multi-agent system using training data including system messages to establish the functionality of the large language model, user messages in a form received by the large language model, and response messages output by the large language model.

* * * * *